Aug. 16, 1932.    R. FURRER    1,872,067
APPARATUS FOR FORMING BEADS ON TUBULAR ARTICLES
Filed July 29, 1929    2 Sheets-Sheet 1
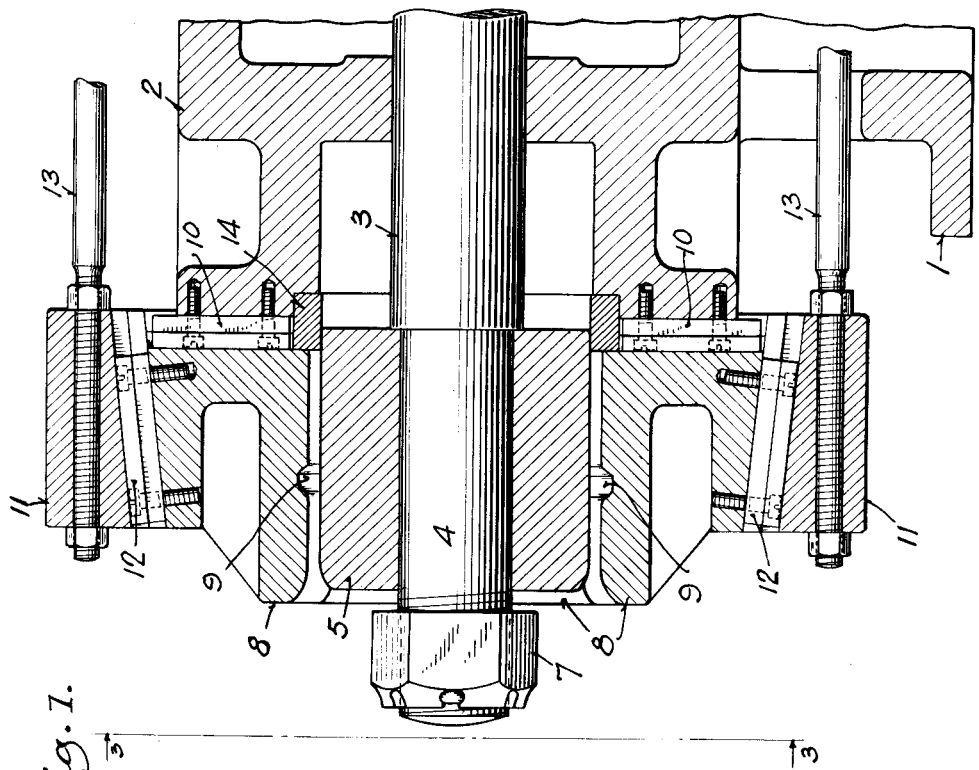
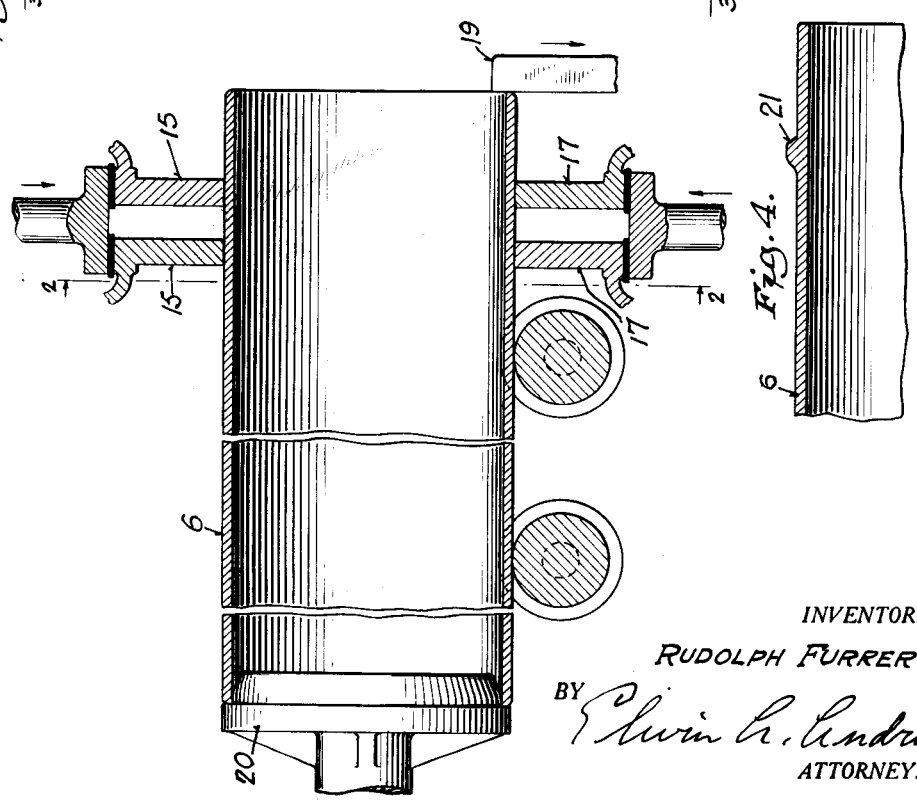
INVENTOR.
RUDOLPH FURRER
BY
ATTORNEY.

Aug. 16, 1932.　　　　R. FURRER　　　　1,872,067
APPARATUS FOR FORMING BEADS ON TUBULAR ARTICLES
Filed July 29, 1929　　2 Sheets-Sheet 2
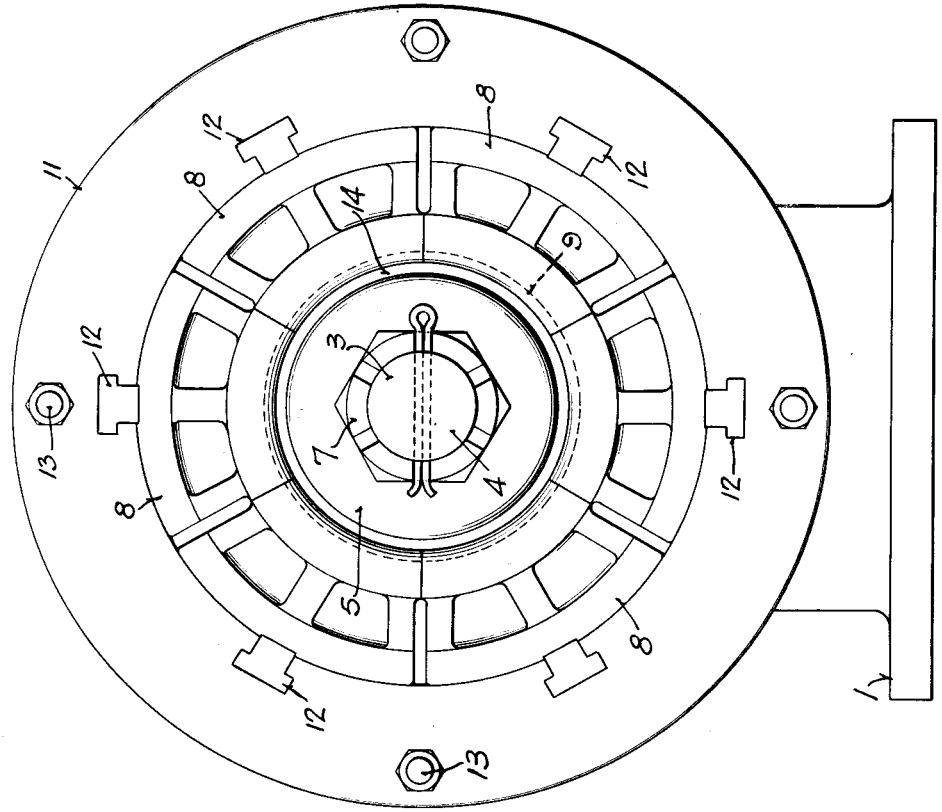
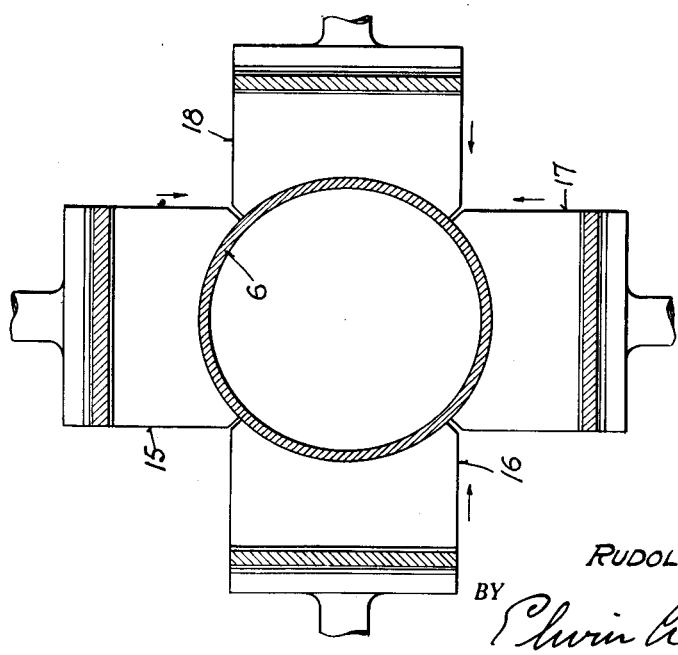
INVENTOR.
RUDOLPH FURRER
BY
ATTORNEY.

Patented Aug. 16, 1932

1,872,067

UNITED STATES PATENT OFFICE

RUDOLPH FURRER, OF WAUWATOSA, WISCONSIN, ASSIGNOR TO A. O. SMITH CORPORATION, OF MILWAUKEE, WISCONSIN, A CORPORATION OF NEW YORK

APPARATUS FOR FORMING BEADS ON TUBULAR ARTICLES

Application filed July 29, 1929. Serial No. 381,982.

This invention relates to an apparatus for forming beads on tubular articles intermediate the ends thereof.

The object of the invention is to provide an improved apparatus for the purpose above mentioned which is simple and efficient in operation, which may be readily adjusted for articles of varying diameters, and which will accurately form the bead.

Other objects of the invention will appear hereinafter in connection with the detailed description of the embodiment illustrated in the accompanying drawings; the views of the drawings being as follows:

Figure 1 is a longitudinal sectional view of the preferred form of apparatus.

Fig. 2 is a sectional view taken on line 2—2 of Figure 1.

Fig. 3 is an end elevation of the upsetting apparatus taken on line 3—3 of Figure 1.

Fig. 4 is a detail view of the finished pipe section.

The apparatus is particularly adapted for forming welding dams employed for joining adjacent sections of pipe lines used in the transportation of oil, gas, and other fluids such as disclosed in the co-pending application of Rudolph Furrer, Serial No. 293,184, filed July 16, 1928.

The apparatus comprises in general a base 1 having a frame 2 secured thereto for supporting a bead-forming mechanism. A rod 3 is arranged horizontally and centrally of the frame 2 with an end portion of reduced diameter 4 for receiving a mandrel 5. The mandrel 5 is preferably slidable on the rod and the rod is slidable on the frame, the movement of the rod being controlled by hydraulic or other suitable means. The mandrel 5 preferably has a diameter corresponding to the inside diameter of the tubular article or pipe 6 being worked upon so as to prevent the metal walls of the article from flowing inwardly during the upsetting operation and to thus provide a finished tubular article having a uniform inside diameter. A nut 7 is arranged on the end of the rod 3 to limit the sliding movement of the mandrel on said rod and to impart a blow to said mandrel to remove the same from the tubular article after the upsetting operation.

The bead-forming die members 8 are preferably segmental and arranged radially about the mandrel 5 and in a circle concentric therewith. Each die member is provided with an arcuate bead-forming concavity 9 upon the inner surface thereof, and when the die members are arranged as above set forth these concavities cooperate to form a circumferential mold for the bead. The shape of the concavities determines the shape of the bead to be formed. The segmental die members 8 are slidably supported by the frame 2 by suitable radially extending tongue and groove connections 10. The die members 8 are moved radially by means of a circumferential collar 11 which has an inclined tongue and groove connection 12 with each of said die members. These connections are preferably of a dove-tail or T-shape to compel the uniform movement of all of the die members 8 radially irrespective of whether such die members move upwardly or downwardly.

The collar 11 is moved longitudinally by means of rods 13 which are preferably operated by hydraulic means not shown.

When the die members are in their closed position, the distance between the inner walls thereof and the wall of the mandrel is substantially that of the thickness of the tubular article 6 so that the space between the die members and the mandrel will readily receive the article.

The rear of this space is closed by a hard steel block 14 which will withstand repeated blows.

In the operation of the apparatus, the article 6 is heated in a local circumferential region corresponding to the region to be upset into the bead in any suitable manner.

This is done preferably by passing an electric current longitudinally through the local region of the article from a plurality of pairs of spaced electrodes 15, 16, 17, and 18, arranged circumferentially around the article. These pairs of electrodes are radially movable and preferably provided with current from independent transformers controlled substantially simultaneously. An adjustable stop or gage member 19 is provided to accurately gage the distance of the locally heated region from the end of the pipe.

When the local region of the pipe has been heated to a suitable temperature to make the metal thereof plastic, the gage member 19 is removed and the electrodes moved radially away from the article. The article is then moved longitudinally by means of the pusher 20 into the space between the die members 8 and the mandrel 5. When the article hits the block 14 the continued movement of the pusher 20 causes the heated region of the metal of the article to be upset into the concavity 9, thus forming a bead 21 around the article.

The die members are then radially moved away from the article to release the bead which has been formed. The rod 3 is moved to loosen and withdraw the mandrel 5 from the inside of the pipe and the pipe is then removed from the machine in its finished condition.

The invention may be embodied in various forms and modifications within the scope of the accompanying claims, and may be employed to produce beads on the inside or on both sides of the article as well as on the outside as shown.

I claim:

1. An apparatus for forming a circumferential bead intermediate the ends of a tubular article, comprising a mandrel, a plurality of radially movable die members arranged about the axis of said mandrel and having a circumferential bead-forming concavity therein, said die members cooperating with said mandrel and providing a limited space therebetween for receiving the article, means symmetrically arranged about said axis and longitudinally spaced from said dies for locally heating said article in the region where the bead is to be formed, means for advancing said article along said axis to an operative position with respect to said heating means and thereafter continuing the axial advance of said article to upset the locally heated region thereof in said bead-forming concavity and means cooperating with said mandrel to drive the latter from said tubular article upon completion of the upsetting operation.

2. In apparatus for heating and subsequently forming a bead intermediate the ends of a tubular article, a mandrel, a plurality of radially movable segmental dies having a circumferential bead-forming concavity therein and being arranged concentrically about and in spaced relation to said mandrel, means for locally heating said article in the region where the bead is to be formed, said heating means being longitudinally spaced from and arranged symmetrically with respect to the axis of said mandrel and means for advancing said tubular article along said axis to position the same, first in said heating means, and thereafter further advancing the article into an operative position between said mandrel and dies to cause upsetting of the locally heated region in said bead-forming concavity.

3. In apparatus for heating and subsequently forming a bead intermediate the ends of a tubular article, a mandrel, a plurality of radially movable segmental dies having a circumferential bead-forming concavity therein and being arranged concentrically about and in spaced relation to said mandrel, means for locally heating said article in the region where the bead is to be formed, said heating means being longitudinally spaced from and arranged symmetrically with respect to the axis of said mandrel, and a plunger cooperating with said heating means and said dies to advance the article along said axis to position the same, first in the heating means, and thereafter further advancing the article into an operative position between the mandrel and dies to cause upsetting of the locally heated region in said bead-forming concavity.

4. Apparatus for forming a circumferential bead on a tubular article comprising a frame, means on the frame for supporting a tubular article for movement longitudinally, means for exerting force on one end of the article to move it, a movable stop member disposed to engage the other end of the article to stop it at predetermined position, heating means disposed to heat a circumferential region of the article at predetermined position relative to the end thereof engaged by the stop member, means for withdrawing the heating means and the movable stop member to permit the article to be advanced longitudinally, a mandrel disposed in axial alignment with the article for engaging its inner surface, a plurality of radially retractable die members having working faces constituting a circumferential bead forming concavity disposed concentrically about the mandrel and spaced therefrom sufficient distance to permit the end of the tubular article to enter between them, a positive stop member disposed in predetermined relation to the bead forming concavity of the dies for stopping the tubular article being advanced by the force exerting means with the heated area adjacent to the bead forming concavity whereby the article is upset at the heated region to conform to the contour of the dies, means for retracting the dies radially to disengage them from the tubular article, means for withdrawing the mandrel longitudinally from the article while it is held stationary by the positive stop member, and a lost-motion mechanism in the mandrel withdrawing means for imparting a blow to the mandrel to release it from within the tubular article.

In witness whereof I have signed my name at Milwaukee, Wisconsin, this 26th day of July, 1929.

RUDOLPH FURRER.